(12) United States Patent
Larson

(10) Patent No.: US 11,047,114 B2
(45) Date of Patent: Jun. 29, 2021

(54) METHOD AND DEVICE TO COLLECT WATER

(71) Applicant: QF Technologies AS, Rodberg (NO)

(72) Inventor: Ralf Larson, Turnhovd (NO)

(73) Assignee: QF TECHNOLOGIES AS, Rodberg (NO)

( * ) Notice: Subject to any disclaimer, the term of this patent is extended or adjusted under 35 U.S.C. 154(b) by 0 days.

(21) Appl. No.: 15/974,068

(22) PCT Filed: Nov. 13, 2015

(86) PCT No.: PCT/IB2015/002208
§ 371 (c)(1),
(2) Date: May 8, 2018

(87) PCT Pub. No.: WO2017/081505
PCT Pub. Date: May 18, 2017

(65) Prior Publication Data
US 2018/0363276 A1    Dec. 20, 2018

(51) Int. Cl.
*E03B 3/03* (2006.01)
*E03B 3/02* (2006.01)

(52) U.S. Cl.
CPC .............. *E03B 3/03* (2013.01); *E03B 3/02* (2013.01); *Y02A 20/00* (2018.01); *Y02A 20/108* (2018.01)

(58) Field of Classification Search
CPC ..... E03B 3/03; E03B 3/02; E03B 3/00; E03B 3/30; Y02A 20/108
See application file for complete search history.

(56) References Cited

U.S. PATENT DOCUMENTS

| 3,730,120 | A | * | 5/1973 | Dobell | B63B 38/00 114/256 |
| 4,092,827 | A | | 6/1978 | Schneider | |
| 4,998,900 | A | * | 3/1991 | Wright | B63C 9/04 114/349 |
| 7,382,332 | B2 | * | 6/2008 | Essig, Jr. | F21S 11/00 343/878 |
| 7,612,735 | B2 | * | 11/2009 | Essig, Jr. | B01D 61/06 343/915 |
| 7,726,906 | B2 | | 6/2010 | Essig, Jr. et al. | |

(Continued)

FOREIGN PATENT DOCUMENTS

CN    201080621 Y    7/2007
CN    201016178 Y    2/2008

(Continued)

OTHER PUBLICATIONS

WO2017081505 Search report published Jul. 6, 2016, with Written Opinion and IPRP.
Extended European Search Report dated May 21, 2019, as received in Application No. 15908230.4.
Chinese First Office Action and Translation dated Aug. 5, 2019, from the China National Intellectual Property Administration in CN Application No. 2015800845689, 8 pages.

(Continued)

*Primary Examiner* — Don M Anderson
(74) *Attorney, Agent, or Firm* — Schott, P.C.

(57) ABSTRACT

The present invention relates to a method and a device to collect rain water, and during favorable conditions, condense humidity out from the air during night time by using a foldable membrane and a hose to bring the water out to a transport container. To obtain mobility the supporting walls of the equipment are inflatable and may be temporarily connected to the ground but also to a boat or similar when floating.

10 Claims, 2 Drawing Sheets

(56) References Cited

U.S. PATENT DOCUMENTS 9,469,383 B1 * 10/2016 Cooper ................. B63B 35/00
2018/0363276 A1    12/2018 Larson

FOREIGN PATENT DOCUMENTS

| | | |
|---|---|---|
| CN | 201080621 Y | 7/2008 |
| GB | 734139 A | 7/1955 |
| GB | 1 237 142 A | 6/1971 |
| GB | 1237142 | 6/1971 |
| GB | 1237142 A | 6/1971 |
| GB | 2441539 A | 3/2008 |
| JP | S61135796 U | 8/1986 |
| JP | 2001146766 A | 5/2001 |
| JP | 2003138612 A | 5/2003 |
| JP | 6615377 B1 | 12/2019 |
| SE | 1500300 A1 | 2/2016 |
| WO | 02/097917 A1 | 12/2002 |
| WO | 2011084041 A3 | 11/2011 |
| WO | 2015/122852 A1 | 8/2015 |

OTHER PUBLICATIONS

Japanese Office Action, Notice of Reasons of Rejection and Translation dated Jul. 23, 2019, from Japanese Patent Office in JP Application No. 2018-544441, 2 pages.
Substantive Examination Report Stage I issued in corresponding Indonesian Application P00201804096 dated Jan. 17, 2020, 3 pages.
Chinese Decision of Rejection Issued from the China National Intellectual Property Administration, in the Corresponding CN Patent Application No. 2015800845689 dated Aug. 18, 2020, 4 pages.
Notification of Third Office Action Issued from China National Intellectual Property Administration within the Chinese Application No. 201580084568.9, dated Jun. 11, 2020, 10 pages.
Chinese Office action dated Jun. 11, 2020 in related application 201580084568.9.
European Communication Pursuant to Article 94(3) EPC issued by the European Patent office, dated Jun. 25, 2020, 9 pages.
Office action from related CN application 201580084568.9 dated Jan. 29, 2021.

* cited by examiner

METHOD AND DEVICE TO COLLECT WATER

BACKGROUND AND PROBLEM

The resources of drinking water are strongly restricted in many countries throughout the world. In many countries you have to walk long distances to collect and carry water back home. But also a highly industrialized country as China is suffering from polluted drinking water. Another use is in seas and lakes with salt content or contaminated, in small crafts as rescue vessels life rafts and recreation vessels where you have to bring the drinking water. Rain water is often clean and free of charge.

Inflatable pools can be used to collect rain water, but then you have to pump the water out of the pool as the bottom of the pool is constructed to rest on a planar ground surface. Bathing pools often lack arrangements for anchoring making them easily moved away by the wind when not filled with water. To build a support to raise the pool above the ground level is expensive and time consuming.

THE OBJECT OF THE PRESENT INVENTION AND A WAY TO SOLVE THE PROBLEM

The present invention is working as a mobile rain water collector both for use on land and on water. When not inflated it is easy to deployment by aircrafts or helicopters or by manual move as it have both low weight and volume.

Comprising at least one supporting rack mentioned support walls to carry a funnel shaped membrane with a hose, the one end of which is connected to the outlet of said funnel shaped membrane and the other end of which is being placed outside said support walls and at a level above the ground/water surface allowing the draining to take place by gravity to one or more transport containers. The outlet of the collected rainwater can containing a water treatment filter e.g. activated carbon.

The invention is equipped with attachment eyelets for securing purposes.

DESCRIPTION OF ONE WAY OF A WORKING EXAMPLE

By using a membrane FIG. 3, (2) of a weld able PVC plastic material as a funnel with a centrally positioned drain hole (3) connected to an outlet hose (9) and that the outer edges of said membrane is attached to an inflatable ring shaped wall FIG. 1, (1) so that the outlet (4) of the drain hose is situated on such a height over the ground/water surface that a draining by gravity can take place to a suitable container/can (not shown in the drawing) as the membrane will collect rain or condense water. The height of the support wall shall also be compensated to assure a floating on a water surface.

To stop wind and waves from moving the equipment it is preferably equipped with anchoring and fastening means (8) made from welded plastic tabs having reinforced hole eyelets (6) or staples. At these eyelets or staples ropes are attached and secured by tent pegs (not shown on the drawing) or to a boat or a bridge, or to a bottom anchoring means.

When the air in the supporting walls is deflated through the air valves (7) and the equipment being folded it is easy to move having a size and a weight as a tent for several persons and being stored in a transparent bag.

DESCRIPTION OF THE DRAWINGS

The invention will be more closely described below in connection to the enclosed drawings showing one embodiment. Thus the invention is not restricted to just this shown embodiment but other examples can be made within the scope of the present invention.

Figure 1:
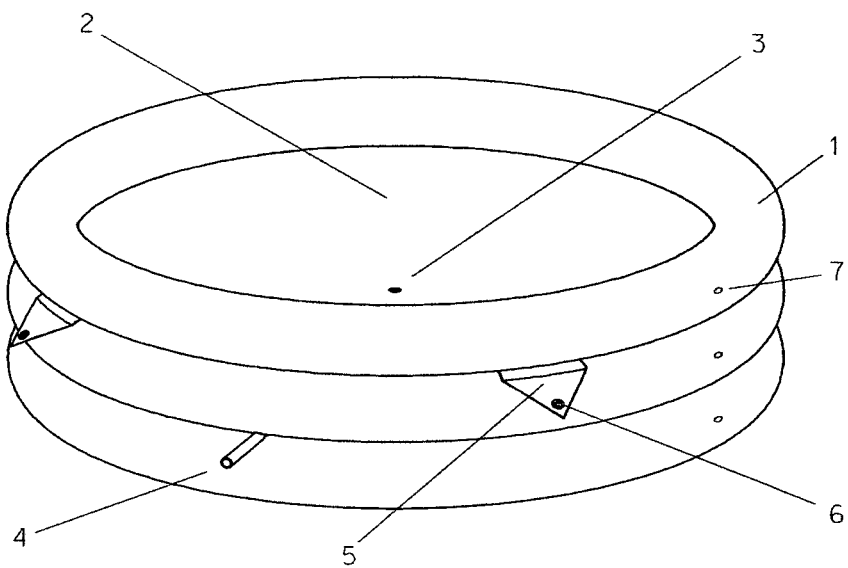
FIG. 1 is a 3-D view of equipment
Figure 2:
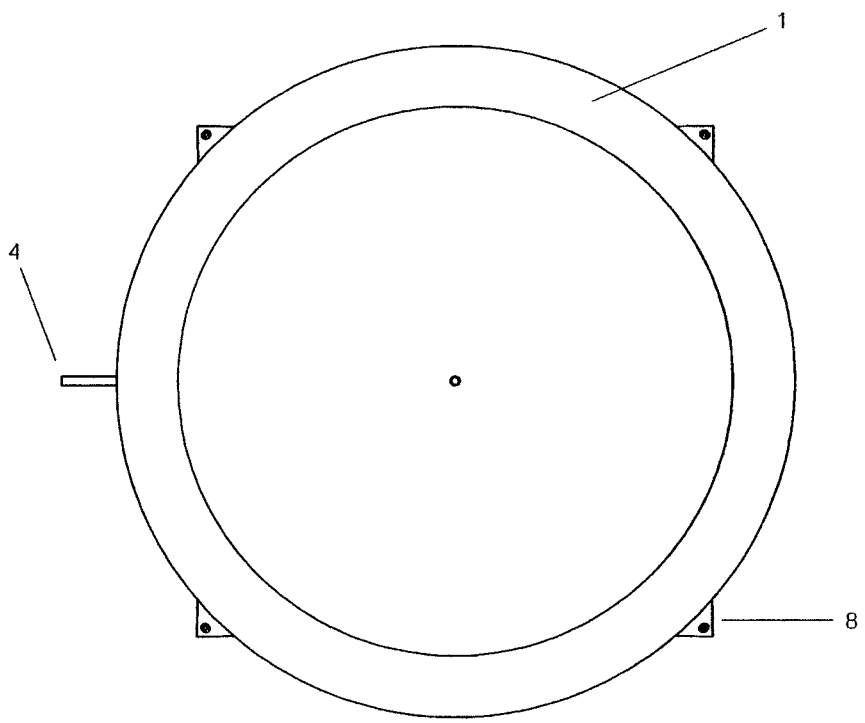
FIG. 2 is a plan view from above.
Figure 3:
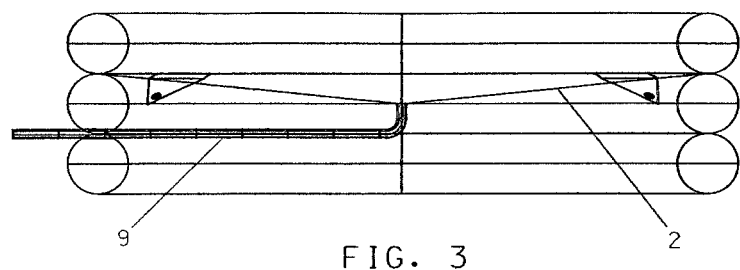
FIG. 3 is a transparent side view

LIST OF THE USED PARENTETIC REFERENCES 1, inflatable supporting wall
2, funnel membrane
3, outlet hole
4, draining hose
5, anchoring tab
6, eyelet
7, air valve
8, anchoring attachment
9, hose connection

What we claimed is:

1. A device for collecting rainwater as a drinking water, said device comprising:
   at least one inflatable support wall (1) arranged to allow the device to float on water that is not the drinking water;
   a mobile rainwater collecting membrane (2), where outer edges of said membrane are attached to the at least one inflatable support wall (1), said membrane (2) comprising a substantially centrally positioned drain hole (3);
   an outlet hose (9) having two ends; and wherein
   said device is arranged to allow gravimetric drain of the rainwater to occur through the substantially centrally positioned drain hole (3) of the membrane (2) and through the outlet hose (9), one end of said outlet hose (9) is connected to the substantially centrally positioned drain hole (3) of the membrane (2) at an underside of said membrane (2) and inside of said at least one inflatable support wall (1);
   characterized in that
   an outlet (4) of the other end of said outlet hose (9) is arranged outside of said at least one inflatable support wall (1) so that the outlet (4) of the drain hose is situated on a height over the water that is not the drinking water when the at least one inflatable support wall (1) is inflated and floating on the water that is not the drinking water, and wherein
   said outlet (4) is arranged to allow said gravimetric drain of the rain water from said device to a collection vessel without a device supporting substrate being able to contaminate the collected rainwater.

2. The device according to claim 1, wherein the wear exposed parts are made of reinforced plastic or rubber foil.

3. The device according to claim 1, wherein inflation of the at least one inflatable support wall is configured to inflate via at least one gas cartridge to via at least one wall connection (7).

4. The device according to claim 3, wherein a valve attached to the at least one inflatable support wall (1) opens to permit the gas cartridge to inflate the support walls, when the support walls are in contact with the water that is not the drinking water.

5. The device according to claim 1, wherein the membrane (2) is funnel-shaped, and the outlet hole (3) to the drain hose is provided with a filter for water treatment, wherein the filter includes activated carbon.

6. The device according to claim 1, wherein attachment eyelets (6) are fitted for anchoring the device.

7. The device according to claim 1, wherein a holding rope or handles is/are located in top of the at least one inflatable support wall.

8. The device according to claim 7, wherein the supporting at least one inflatable support wall has a buoyancy in water and is dimensionally arranged to include holding rope or handles arranged on the device.

9. A method for collecting rain water comprising: attaching a mobile rainwater collecting membrane (2) to an inflatable support wall (1), wherein said inflatable support wall (1) allows the device to float on water; inflating the inflatable support wall (1); floating the inflatable support wall (1) on water; wherein said device allows gravimetric drain of the rain water to occur through a substantially centrally positioned drain hole (3) of the membrane (2) and through an outlet hose (9) connected at one of its ends to said drain hole (3) at an underside of said membrane and arranged inside of said inflatable support wall (I) and the other end of said outlet hose (9) forming an outlet (4), said outlet (4) is arranged on an outside of said inflatable support wall (1), wherein the outlet (4) is situated on a height over the water, and wherein said outlet (4) allowing drain of the collected rain water to a collection vessel without a device supporting substrate being able to contaminate the collected rainwater.

10. The device according to claim 9, wherein the outlet hose (9) extends through the inflatable support wall (1).

\* \* \* \* \*